United States Patent
Yuw et al.

(10) Patent No.: US 10,029,656 B2
(45) Date of Patent: Jul. 24, 2018

(54) CLEANING APPARATUS

(71) Applicant: Kia Motors Corporation, Seoul (KR)

(72) Inventors: Chang Guk Yuw, Gyeonggi-do (KR);
Seung Seog Kim, Gyeonggi-do (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 15/378,330

(22) Filed: Dec. 14, 2016

(65) Prior Publication Data

US 2018/0056946 A1 Mar. 1, 2018

(30) Foreign Application Priority Data

Sep. 1, 2016 (KR) .................. 10-2016-0112728

(51) Int. Cl.
*B60S 3/06* (2006.01)
*B08B 1/04* (2006.01)
*B08B 1/00* (2006.01)
*B08B 5/04* (2006.01)

(52) U.S. Cl.
CPC .............. *B60S 3/06* (2013.01); *B08B 1/002* (2013.01); *B08B 1/04* (2013.01); *B08B 5/04* (2013.01)

(58) Field of Classification Search
CPC ... B60S 3/06; B08B 1/002; B08B 1/04; B08B 5/04; B08B 15/04; B08B 9/021; B08B 9/023; B08B 9/027; B23G 9/009; B23G 2200/20
See application file for complete search history.

(56) References Cited

U.S. PATENT DOCUMENTS

| 4,433,448 A * | 2/1984 | True ................. B08B 9/021 15/104.04 |
| 6,021,537 A * | 2/2000 | Smith ................. A46B 13/04 15/21.1 |
| 6,804,856 B2 * | 10/2004 | Udall ................. A47L 11/302 15/302 |
| 9,357,836 B2 * | 6/2016 | Edmond ................. B08B 9/027 |

FOREIGN PATENT DOCUMENTS

| JP | 2003-047577 A | 2/2003 |
| KR | 20-1996-0013339 U | 5/1996 |
| KR | 10-0520530 | 10/2005 |
| KR | 10-2010-0013678 A | 2/2010 |

* cited by examiner

*Primary Examiner* — Dung Van Nguyen
(74) *Attorney, Agent, or Firm* — Mintz Levin Cohn Ferris Glovsky and Popeo, P.C.; Peter F. Corless

(57) ABSTRACT

A cleaning apparatus is provided. The cleaning apparatus includes a housing assembly having an exterior housing connected with a vacuum intake unit and an interior housing fixed to the exterior housing at a preset interval from an interior surface of the exterior housing. A brush assembly is disposed within the interior housing and is configured to rotate by a drive motor to contact a surface of a cleaning target. An air intake member has an air intake passageway that is connected with a cavity between the exterior housing and the interior housing and is slidably coupled to the housing assembly. A shock absorbing spring is mounted on the housing assembly and is configured to elastically supports the air intake member.

17 Claims, 5 Drawing Sheets

CLEANING APPARATUS

CROSS-REFERENCE TO RELATED APPLICATION

This application claims priority to and the benefit of Korean Patent Application No. 10-2016-0112728 filed in the Korean Intellectual Property Office on Sep. 1, 2016, the entire contents of which are incorporated herein by reference.

BACKGROUND

(a) Field of the Disclosure

The present disclosure relates to a cleaning apparatus, and more particularly, to a vehicle body cleaning apparatus which removes foreign substances such as iron particles attached to a vehicle.

(b) Description of the Related Art

Generally, a vacuum cleaning apparatus is uses a difference of air pressure and is widely used in homes and in industrial sites where a variety of contaminants (e.g., dust) are generated. For example, the vacuum cleaning apparatus is installed in a vehicle body production line to remove various types of contaminants (e.g., dust, iron particle chips, spatters, and oil) that are deposited to a surface of the vehicle body during manufacturing through several production lines. Typically, the contaminants are removed by the cleaning system prior to the painting process since the contaminants cause painting defects during a process of painting the vehicle body.

The dust intake apparatus for a vehicle body in the related art has a structure that eliminates adhesive force of contaminants attached to the vehicle body, and suctions the contaminants by using vacuum pressure of air. However, in the related art, an intake head suctions contaminants on the surface of the vehicle body using a vacuum in a contactless manner when the intake head is spaced apart from the surface of the vehicle body. Accordingly, the contaminants, that are adhered to the surface of the vehicle body by anti-rust oil, are not separated and there is a deterioration in performance in removing the contaminants.

The above information disclosed in this section is merely for enhancement of understanding the background of the disclosure and therefore it may contain information that does not form the prior art that is already known in this country to a person of ordinary skill in the art.

SUMMARY

The present disclosure provides a cleaning apparatus for separating contaminants adhered to a surface of a vehicle body and removing the contaminants by suctioning the contaminants using vacuum air pressure. An exemplary embodiment of the present disclosure provides a cleaning apparatus that may include an exterior housing coupled to a vacuum intake unit (e.g., suction), an interior housing fixed to the exterior housing at a preset interval from an interior surface of the exterior housing, a drive motor disposed within the interior housing and a brush assembly mounted on a driving shaft of the drive motor, configured to rotate by the drive shaft and contact a surface of a cleaning target.

Additionally, in the cleaning apparatus, a ring shaped air intake passageway may be formed between the exterior housing and the interior housing. The cleaning apparatus may include the exterior housing mounted at a tip of an arm of a robot by a fixing bracket.

Another exemplary embodiment of a cleaning apparatus may include a housing assembly having an exterior housing connected with a vacuum intake unit, and an interior housing fixed to the exterior housing at a preset interval from an interior surface of the exterior housing, a brush assembly disposed within the interior housing, contacts a surface of a cleaning target, and configured to rotate by a drive motor, an air intake member with an air intake passageway connected with a cavity between the exterior housing and the interior housing and slidably coupled to the housing assembly and a shock absorbing spring mounted on the housing assembly and configured to elastically support the air intake member.

The cleaning apparatus according to the exemplary embodiment may include the exterior housing and the interior housing fixed by a bolt and a nut. In addition, the cleaning apparatus may include the brush assembly which partially protrudes external to an air intake end of the air intake member.

The cleaning apparatus according to the exemplary embodiment may further include the shock absorbing spring mounted at an outer circumference of the exterior housing. The exterior housing may include a first portion with an upper end opened and connected with the vacuum intake unit and a second portion integrally connected with a lower portion of the first portion, has an interior diameter greater than the first portion, and opened at a lower end.

The interior housing may have a closed upper end and an opened lower end, and may be disposed within the second portion through a lower end of the second portion. The drive motor may be fixedly mounted within the interior housing by a mounting bracket.

Further, the brush assembly may include a brush body coupled to a driving shaft of the drive motor and brush bristles fixed to the brush body and that partially protrude external to the air intake end of the air intake member. The air intake member may include an interior body which is slidably coupled to the interior housing at an outer periphery of the brush assembly and an exterior body connected with the interior body, may be slidably coupled to the exterior housing and the air intake passageway may be formed between the exterior body and the interior body.

In other exemplary embodiments, the air intake passageway may be provided in a ring shape between the interior body and the exterior body. A plurality of stopping protrusions may protrude in an upward direction from an upper end of the exterior body in an outer circumferential direction of the exterior housing. For example, the stopping protrusions may be captured by a ring shaped stopper disposed on an outer circumferential surface of the exterior housing.

The stopping protrusion may be configured to penetrate the stopper, and a hook protrusion captured by the stopper, may be formed at an upper end of the stopping protrusion. Additionally, in the cleaning apparatus a guide flange, configured to guide intake air to the air intake passageway, may be formed at a lower end edge of the exterior body.

The shock absorbing spring may be mounted at an outer circumference of the exterior body and may be configured to elastically support the guide flange. Further, the shock absorbing spring may support the stopper and the guide flange and may be disposed at an outer circumference of the exterior body. A duct member, through which an electric wire connected to the drive motor may be extended external to the exterior housing and external air as cooling air may be introduced into the interior housing, may be installed in the interior housing. An air discharge aperture coupled to an interior of the exterior housing and configured to discharge the cooling air, may be formed in the interior housing.

According to the exemplary embodiment contaminants adhered to the surface of the vehicle body in a contact manner may be separated and removed by suctioning air using vacuum suction pressure, unlike the related art in which contaminants are removed by vacuum suction pressure of air in a contactless manner Therefore, in the exemplary embodiment of the present disclosure, the inflow amount of iron particles on the vehicle body to be loaded into the painting process from the vehicle body assembling process may be reduced and electrodeposition painting quality for the vehicle body may be improved.

Additionally, suction pressure of air by the air intake member having the dual housing structure and the ring shaped air intake cross section may be maximized. Further, efficiency in removing contaminants by utilizing the entire intake air as effective air for suctioning contaminants may be improved. In the exemplary embodiment of the present disclosure, when cooling air is introduced to the drive motor and discharged to the exterior by vacuum suction pressure of air, the drive motor may be prevented from being overheated.

BRIEF DESCRIPTION OF THE DRAWINGS

The drawings are intended to be used as references for describing the exemplary embodiments of the present disclosure, and the accompanying drawings should not be construed as limiting the technical spirit of the present disclosure.

DETAILED DESCRIPTION

Figure 1:
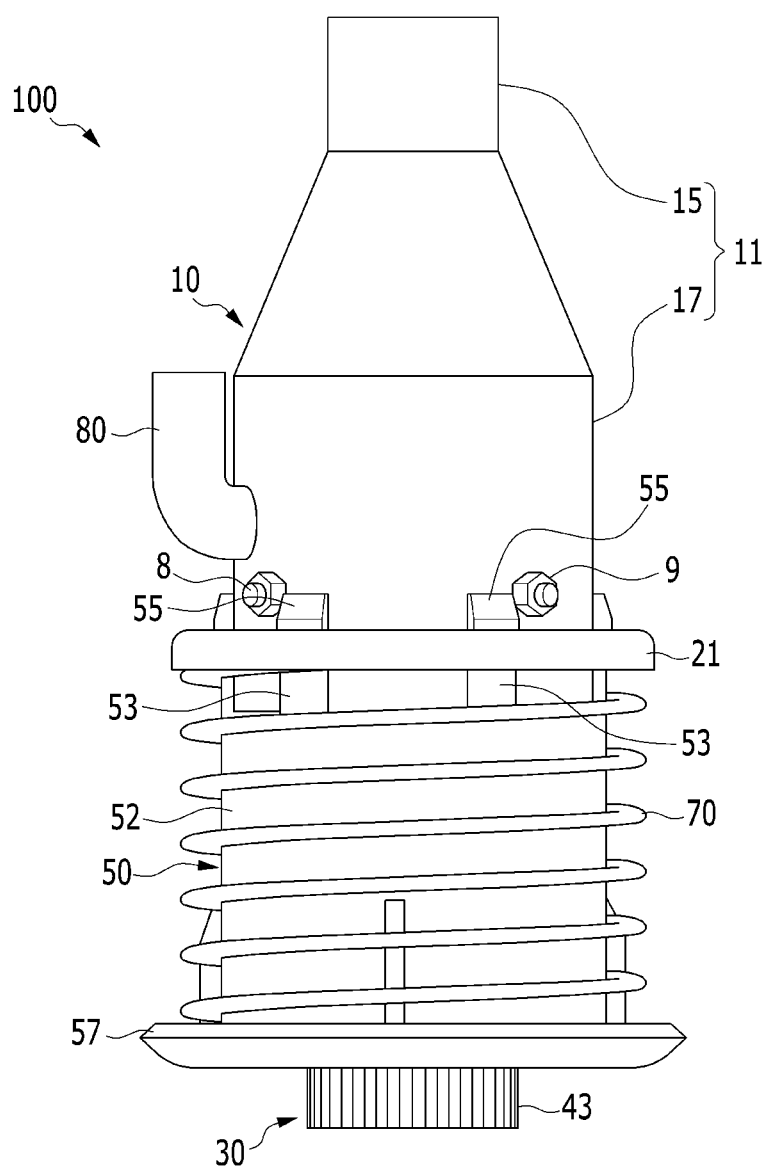
FIG. 1 is an exemplary perspective view illustrating a cleaning apparatus according to an exemplary embodiment of the present disclosure.

Hereinafter, the present disclosure will be described more fully hereinafter with reference to the accompanying drawings, in which example embodiments of the disclosure are shown. As those skilled in the art would realize, the described embodiments may be modified in various different ways, all without departing from the spirit or scope of the present disclosure. A part irrelevant to the description will be omitted to clearly describe the present disclosure, and the same or similar constituent elements will be designated by the same reference numerals throughout the specification. The size and thickness of each component illustrated in the drawings are arbitrarily shown for understanding and ease of description, but the present disclosure is not limited thereto. Thicknesses of several portions and regions are enlarged for clearly describing the above.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. Unless otherwise described, throughout the specification, the word "comprise" and variations such as "comprises" or "comprising" will be understood to imply the inclusion of stated elements, not the exclusion of any other elements. In addition, the term "unit", "means", "part", "member", or the like, which is described in the specification, means a unit of a comprehensive configuration that performs at least one function or operation. As used herein, the term "and/or" includes any and all combinations of one or more of the associated listed items.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 2:
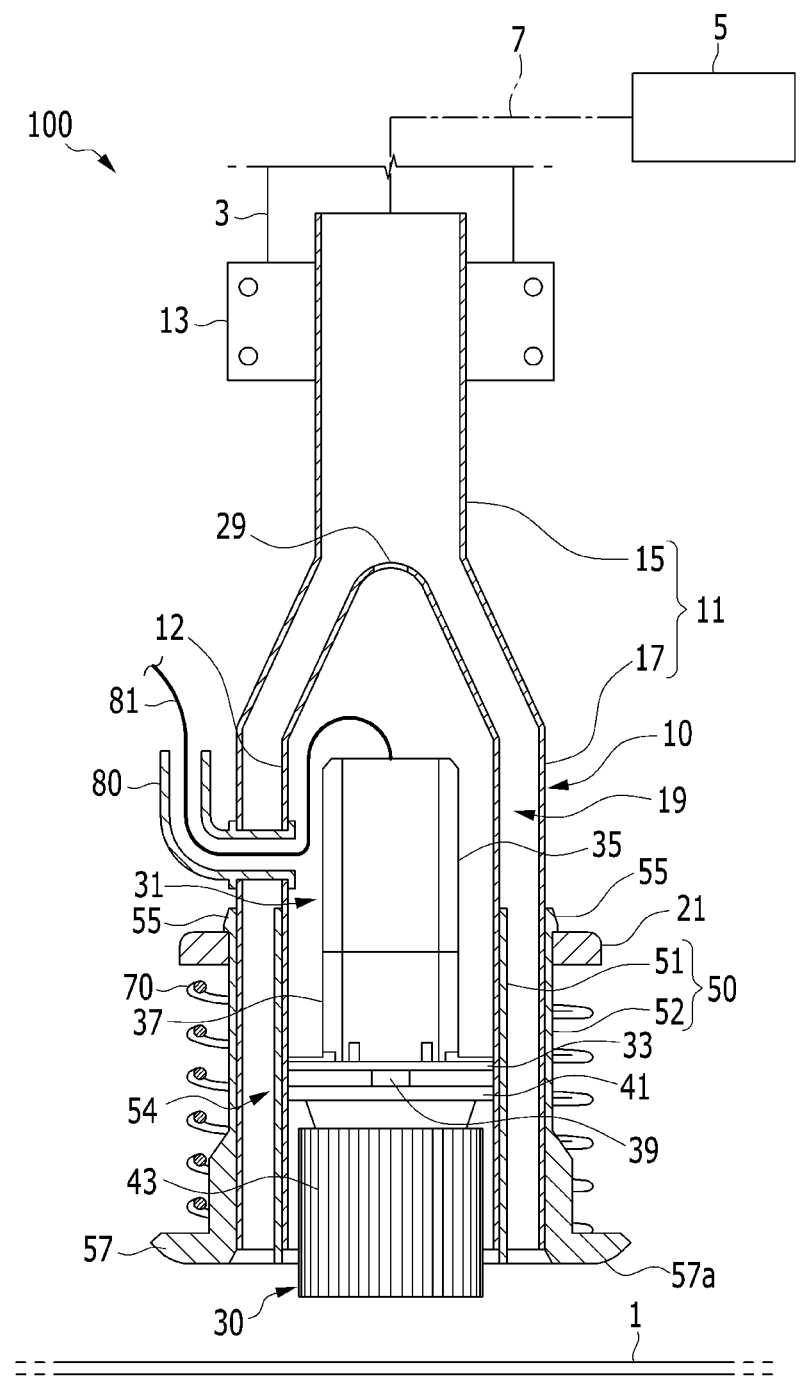
FIG. 2 is an exemplary cross-sectional configuration diagram illustrating the cleaning apparatus according to the exemplary embodiment of the present disclosure.

FIG. 1 is an exemplary perspective view illustrating a cleaning apparatus according to an exemplary embodiment of the present disclosure. FIG. 2 is an exemplary cross-sectional configuration diagram illustrating the cleaning apparatus according to the exemplary embodiment of the present disclosure. Referring to FIGS. 1 and 2, a cleaning apparatus 100 according to an exemplary embodiment of the present disclosure may be applied to a vehicle body assembling process in which press-molded vehicle body components are assembled by spot welding or laser welding and a vehicle body in the form of a white body (B.I.W) is manufactured.

The vehicle body cleaning apparatus 100 according to the exemplary embodiment of the present disclosure removes various types of contaminants attached to the vehicle body before the vehicle body, as a cleaning target 1, is loaded into a painting process from the vehicle body assembling process. For example, the cleaning apparatus 100 may remove contaminants such as iron particles and spatters adhered to an oil film on the surface of the vehicle body using intake air caused by vacuum pressure when vehicle body welding or laser implanting is performed during the vehicle body assembling process. However, it should not be understood that the protection scope of the present disclosure is not limited to the function of removing contaminants attached to the vehicle body, and the technical spirit of the present disclosure may be applied to various types of cleaning targets 1 for various purposes.

Hereinafter, the following constituent elements will be described based on a state in which the cleaning apparatus 100 stands vertically, portions directed upward may be defined as an upper portion and an upper end, and portions directed downward may be defined as a lower portion and a lower end. The definition about the directions indicates relative meanings, and the directions may be changed in accordance with reference positions of the cleaning apparatus 100 and the cleaning target 1 and as a result, the reference directions are not necessarily limited to the reference direction of the exemplary embodiment.

The cleaning apparatus 100 according to the exemplary embodiment of the present disclosure has a structure that may separate iron particles adhered to the surface of the cleaning target 1 in a contact manner and may remove the iron particles by using vacuum pressure of air. The exemplary embodiment of the present disclosure includes the cleaning apparatus 100 that may reduce the inflow amount of iron particles on the vehicle body to be loaded into the painting process from the vehicle body assembling process that may further improve electrodeposition painting quality for the vehicle body. In particular, the cleaning apparatus 100 may include a housing assembly 10, a brush assembly 30, and an air intake member 50, and the respective components will be described below.

In the exemplary embodiment, the housing assembly 10 may be a dual housing assembling structure and may include an exterior housing 11 and an interior housing 12. The exterior housing 11 may be mounted at a tip of an arm of a robot 3 by a fixing bracket 13 and connected with a vacuum intake unit 5. For example, the vacuum intake unit 5 may provide a vacuum suction force to the exterior housing 11, air may be suctioned through the exterior housing 11 using the vacuum suction force and may remove contaminants on the cleaning target 1 and the vacuum intake unit 5 may be connected with the exterior housing 11 through a hose 7.

The exterior housing 11 may include a first portion 15 as an upper portion and a second portion 17 as a lower portion. The first portion 15 may be formed in a cylindrical shape which is opened at an upper end and the upper end may be connected with the vacuum intake unit 5 through the hose 7. The second portion 17 may be integrally connected to a lower portion of the first portion 15 and may have a an interior diameter greater than the first portion 15 and the second portion 17 may be opened at a lower end to form an open end. The interior housing 12 may be disposed within the exterior housing 11 and fixed to the exterior housing 11 at a preset interval from an interior surface of the exterior housing 11. The interior housing 12 may include a structure which is closed at an upper end and opened at a lower end and the interior housing 12 may be disposed within the second portion 17 through the open end of the second portion 17.

In the exemplary embodiment of the present disclosure, the exterior housing 11 and the interior housing 12 may be fixed to each other by bolts 8 and nuts 9 while having a preset interval between an interior circumferential surface of the exterior housing 11 and an outer circumferential surface of the interior housing 12. Moreover, the exterior housing 11 and the interior housing 12 may define a separation cavity 19 between the interior circumferential surface of the exterior housing 11 and the outer circumferential surface of the interior housing 12 by a partition wall (not illustrated in the drawings) provided on the outer circumferential surface of the interior housing 12. The separation cavity 19 may be an intake path of air to be suctioned to the vacuum intake unit 5.

In the exemplary embodiment of the present disclosure, the brush assembly 30 may separate contaminants adhered to the surface of the cleaning target 1 and may be configured to be rotated by a driving source when the brush assembly 30 is in contact with the surface of the cleaning target 1. The brush assembly 30 may be disposed within the interior housing 12 and may be configured to be rotated by a drive motor 31 which is the driving source. For example, the drive motor 31 may be fixedly mounted within the interior housing 12 by a mounting bracket 33. The drive motor 31 may include a motor unit 35 and a speed reduction unit 37 connected to the motor unit 35.

The brush assembly 30 may be mounted on a driving shaft 39 of the speed reduction unit 37 and may be configured to be rotated by the driving shaft 39. The brush assembly 30 may include a brush body 41 having a circular plate shape, and brush bristles 43 fixed to the brush body 41. The brush body 41 may be mounted on the driving shaft 39 of the speed reduction unit 37. The brush bristles 43 may be substantially in contact with the surface of the cleaning target 1. In particular, the brush contaminants adhered to the cleaning target 1 and for example, the brush bristles 43 may be made of a fiber material, but is not limited thereto. The brush bristles 43 may partially protrude to the outside of an air intake end (e.g., the outside of a lower end in the drawings) of the air intake member 50 which will be described below.

In the exemplary embodiment of the present disclosure, the air intake member 50 may be configured to suction air by vacuum suction pressure applied from the aforementioned vacuum intake unit 5 through the separation cavity 19 between the exterior housing 11 and the interior housing 12. In other words, the air intake member 50 may be configured to suction contaminants, which are separated from the surface of the cleaning target 1 by the brush assembly 30, together with air by vacuum suction pressure.

The air intake member 50 may be disposed at a lower side of the housing assembly 10. The air intake member 50 may include an air intake passageway 54 connected with the separation cavity 19 between the exterior housing 11 and the interior housing 12, and may be coupled to the housing assembly 10 to be slidable vertically. The air intake member 50 may include an interior body 51 and an exterior body 52. The interior body 51 may be slidably coupled to the interior housing 12 at an outer periphery of the brush assembly 30. The exterior body 52 may be connected to the interior body 51 at a preset interval from the interior body 51 external to the interior body 51, and slidably coupled to the exterior housing 11.

An outer circumference of the interior body 51 and an interior circumference of the exterior body 52 may be integrally connected through a partition wall which is not illustrated in the drawings. Therefore, the air intake passageway 54 having a preset interval may be formed by the partition wall between an outer circumferential surface of the interior body 51 and an inner circumferential surface of the exterior body 52. The air intake passageway 54 may be disposed between the interior body 51 and the exterior body 52 to form a flow path cross section having a ring shape and connected with the separation cavity 19 between the exterior housing 11 and the interior housing 12. For example, the air intake end (lower end in the drawings) of the air intake member 50 may maintain a predetermined gap with a plane of the cleaning target 1.

Figure 3:
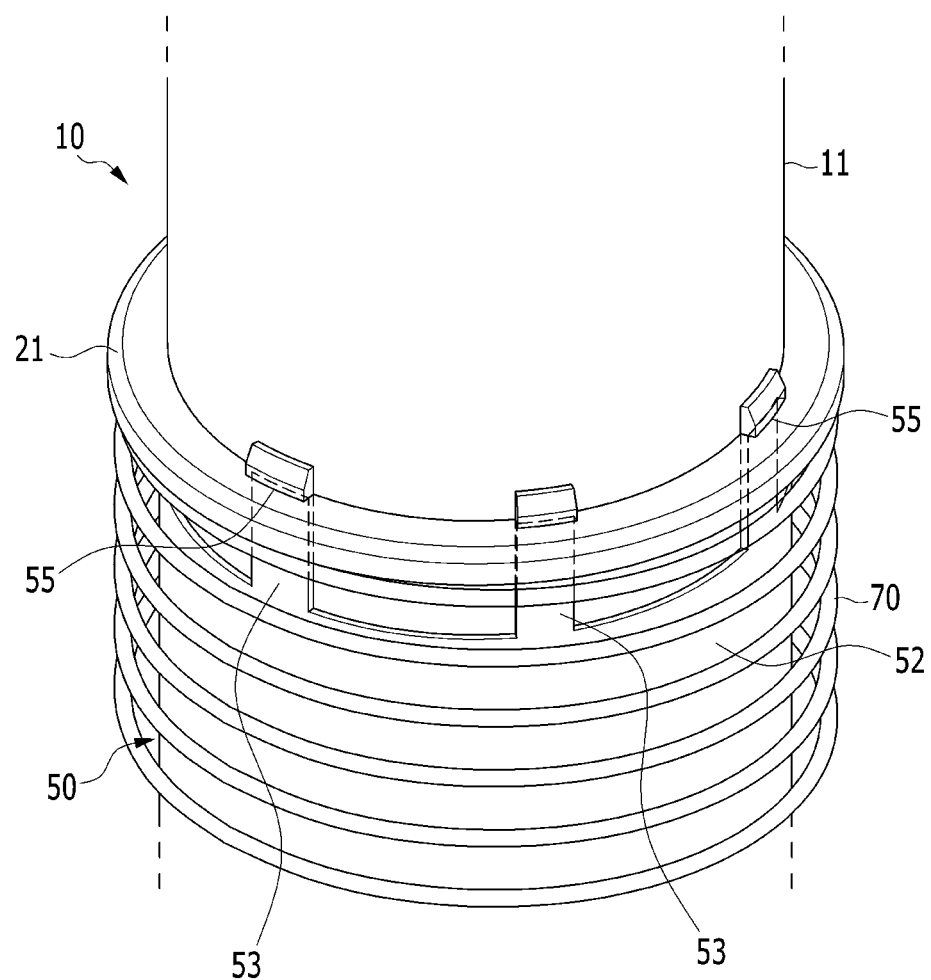
FIG. 3 is an exemplary view illustrating a coupling structure of an air intake member which is applied to the cleaning apparatus according to the exemplary embodiment of the present disclosure.

Moreover, a plurality of stopping protrusions 53 may extend in an upward direction (e.g., vertical) from an upper end of the exterior body 52 in an outer circumferential direction of the exterior housing 11. The stopping protrusions 53 may be configured to vertically slip along the outer circumferential surface of the exterior housing 11. The stopping protrusions 53 may be captured by a ring shaped stopper 21 disposed on the outer circumferential surface of the exterior housing 11. In particular, as illustrated in FIG. 3, the stopping protrusions 53 may penetrate the stopper 21 and a hook protrusion 55, captured by the stopper 21, may be formed at an upper end of each of the stopping protrusions 53.

Therefore, when the structure in which the stopping protrusions 53 are captured by the stopper 21 the air intake member 50 may be coupled to the housing assembly 10 to be vertically slidable by a preset length. Furthermore, a guide flange 57 configured to guide intake air to the air intake passageway 54, may be formed at a lower end edge of the exterior body 52. For example, the guide flange 57 may have a guide surface 57a rounded toward the air intake passageway 54 at an exterior edge end.

Further, the air intake end of the air intake member 50, which configured as described above, may be positioned to abut the surface of the cleaning target 1. The air intake member 50 may be elastically provided to absorb shock with respect to an irregular surface (e.g., an unevenness portion and a corner portion) of the cleaning target 1. In other words, in the exemplary embodiment, the occurrence of scratches on the cleaning target 1 may be inhibited by bringing the air intake member 50 into close contact with an irregular surface of the cleaning target 1 and attenuating impact occurring between the air intake member 50 and the irregular surface.

In particular, the exemplary embodiment of the present disclosure may include a shock absorbing spring 70 mounted on the housing assembly 10 and configured to elastically support the air intake member 50. The shock absorbing spring 70 may be mounted at an outer circumference of the exterior housing 11 and may be configured to elastically support the air intake member 50. Specifically, the shock absorbing spring 70 may be configured as a coil spring that surrounds the outer circumference of the exterior housing 11 and may be configured to elastically support the stopper 21 and the guide flange 57, which are described above. In other words, at the outer circumference of the exterior housing 11, an upper end portion of the shock absorbing spring 70 may be supported by the stopper 21 and a lower end portion of the shock absorbing spring 70 may be supported by the guide flange 57.

Meanwhile, the cleaning apparatus 100 according to the exemplary embodiment of the present disclosure may include a duct member 80 configured to cool the drive motor 31 within the interior housing 12 in an air-cooled manner. The duct member 80 serves to extend an electric wire 81 connected to the drive motor 31 external to the exterior housing 11 and to introduce outside air as cooling air, into the interior housing 12. The duct member 80 penetrates the exterior housing 11 and the interior housing 12 from the exterior of the exterior housing 11, and may introduce external air into the interior housing 12.

Furthermore, an air discharge aperture 29 may be formed at the upper end of the interior housing 12. The air discharge aperture 29 may be connected to an interior of the exterior housing 11 and may discharge the cooling air (outside air), introduced into the interior housing 12, into the exterior housing 11. In other words, the air discharge aperture 29 may be connected with the separation cavity 19 between the exterior housing 11 and the interior housing 12. Therefore, in the exemplary embodiment of the present disclosure, when vacuum suction pressure is applied to the separation cavity 19 between the exterior housing 11 and the interior housing 12 by the vacuum intake unit 5, the air in the interior housing 12 may be discharged into the separation cavity 19 through the air discharge aperture 29 by the vacuum suction pressure. Since the external air, as cooling air, is introduced into the interior housing 12 through the duct member 80 by the vacuum suction pressure, the drive motor 31 may be air-cooled.

Figure 4:
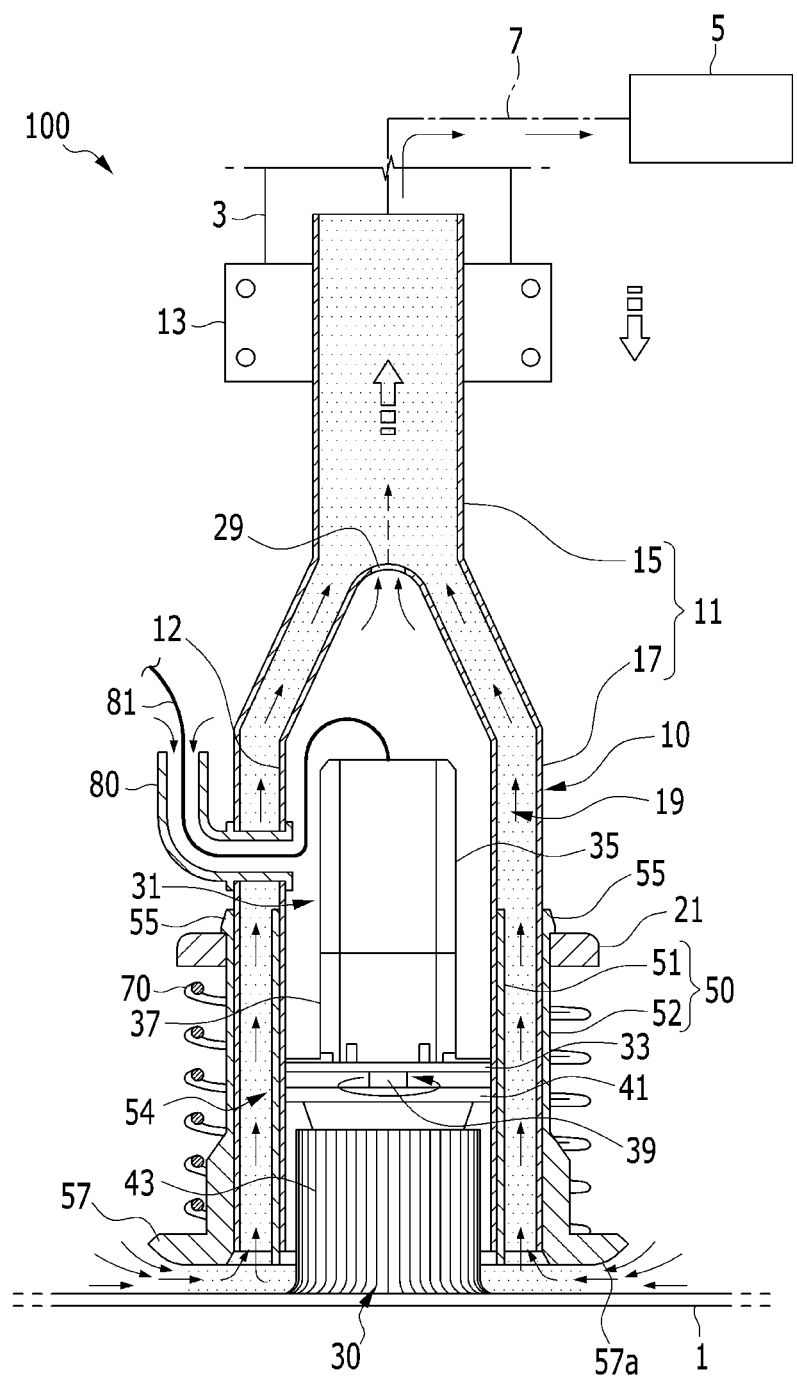
FIGS. 4 and 5 are exemplary views for explaining an operation of the cleaning apparatus according to the exemplary embodiment of the present disclosure.
Figure 5:
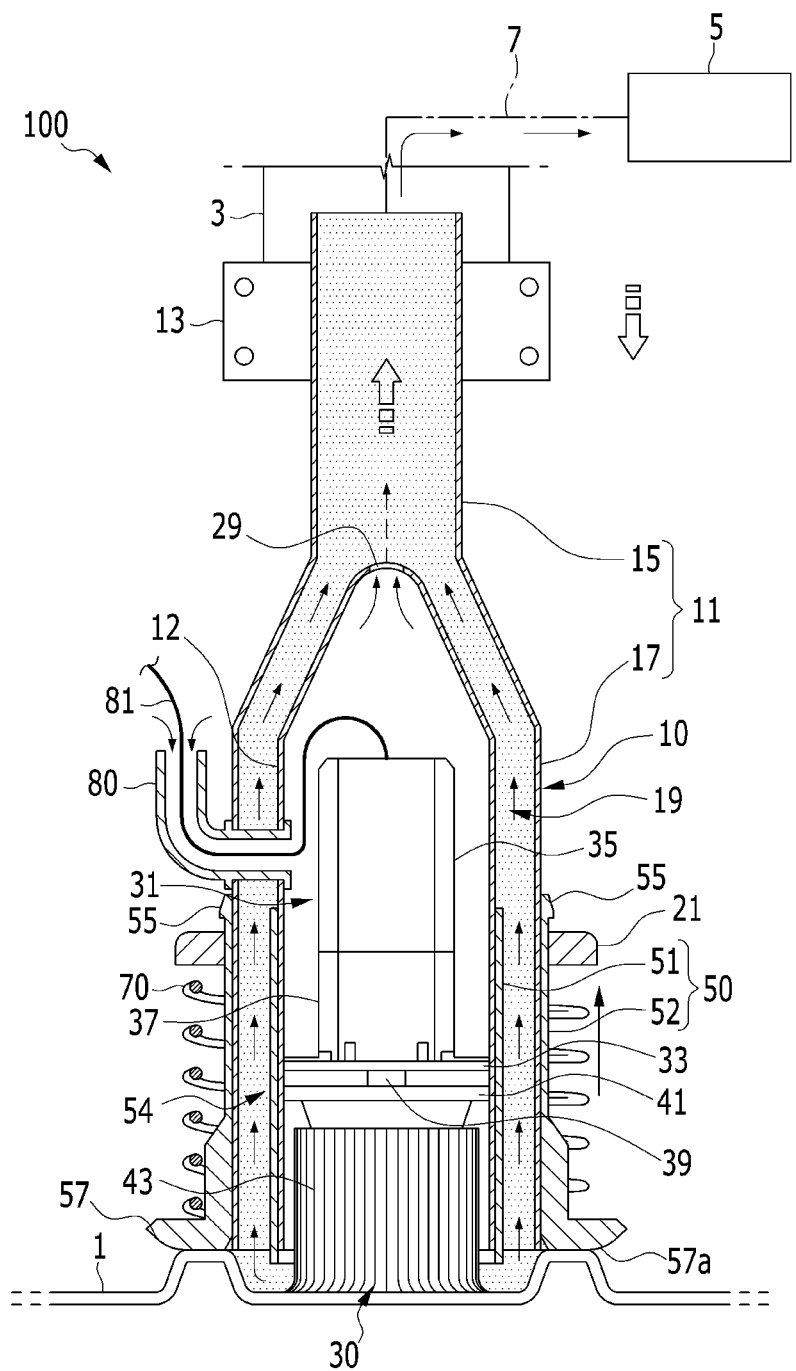

Hereinafter, an operation of the cleaning apparatus according to the exemplary embodiment of the present disclosure, which is configured as described above, will be described in detail with reference to the aforementioned drawings and the accompanying drawings. FIGS. 4 and 5 are exemplary views for explaining an operation of the cleaning apparatus according to the exemplary embodiment of the present disclosure. First, referring to FIG. 4, in the exemplary embodiment, the vehicle body completely assembled in the vehicle body assembling process may be conveyed to a preset workspace. The robot 3 may adjust the cleaning apparatus 100 to the surface of the vehicle body which is the cleaning target 1.

Thereafter, an operational signal may be applied to the drive motor 31, the brush assembly 30 may be rotated by the operation of the drive motor 31 and the brush bristles 43 of the brush assembly 30 may be brought into contact with the surface of the cleaning target 1. Simultaneously, in the exemplary embodiment of the present disclosure, the vacuum intake unit 5 may be operated to apply vacuum suction pressure to the separation cavity 19 between the exterior housing 11 and the interior housing 12. Therefore, when the brush bristles 43 of the brush assembly 30 are brought into contact with the surface of the cleaning target 1 and rotated, contaminants such as iron particles adhered to an oil film of the surface of the cleaning target 1 may be separated by the brush bristles 43. In other words, the contaminants which are separated from the surface of the cleaning target 1 by the brush bristles 43 may be dispersed to the outer periphery of the brush bristles 43.

Further, the air intake member 50 may be configured to suction the contaminants together with air through the air intake passageway 54 by the vacuum suction pressure applied to the separation cavity 19 between the exterior housing 11 and the interior housing 12 from the vacuum intake unit 5. In particular, the intake air may be introduced into the air intake passageway 54 by being guided by the guide flange 57 of the air intake member 50. The contaminants may be suctioned into the air intake passageway 54 flow into the separation cavity 19 between the exterior housing 11 and the interior housing 12 together with the intake air, may be discharged through the first portion 15 of the exterior housing 11 and may be collected in the vacuum intake unit 5 through the hose 7.

For example, in the exemplary embodiment of the present disclosure, air may be suctioned through the air intake passageway 54 having a ring shaped flow path cross section when the air intake end of the air intake member 50 abuts the surface of the cleaning target 1. Since the air intake passageway 54 having the ring shaped flow path cross section is formed in the air intake member 50, an air intake cross-sectional area of the air intake passageway 54 may be less than an air intake cross-sectional area of an intake nozzle in the related art based on the same air flow rate. Therefore suction pressure of air introduced into the separation cavity 19 between the exterior housing 11 and the interior housing 12 at the air intake end of the air intake member 50 may be maximized.

Furthermore, in the exemplary embodiment of the present disclosure, since the guide flange 57 of the air intake member 50 guides the intake air from the surface of the cleaning target 1 to the air intake passageway 54, the entire intake air may be utilized as effective air to suction contaminants, and thus to improve efficiency in removing contaminants. As the robot 3 moves the cleaning apparatus 100 over the entire surface of the cleaning target 1 along a preset teaching route, contaminants adhered to the surface of the cleaning target 1 may be removed by the aforementioned operations.

As illustrated in FIG. 5, when removing contaminants attached to an irregular surface of the cleaning target 1, an unevenness portion or a corner portion of the vehicle body, the air intake member 50 may slide vertically by the shock absorbing spring 70. The brush assembly 30 may abut the surface of the cleaning target 1. Since the shock absorbing spring 70 may be configured to absorb shock in a vertical direction of the air intake member 50, the impact that occurs between the air intake member 50 and the irregular surface may be reduced. Therefore, in contaminants attached to the irregular surface of the cleaning target 1 may be more easily removed and may inhibit scratches from being formed on the surface of the cleaning target 1 due to impact that occurs between the air intake member 50 and the irregular surface.

Further, during the aforementioned processes, the drive motor 31 may be overheated. To prevent the overheat of the drive motor 31, air in the interior housing 12 may be discharged to the separation cavity 19 through the air discharge aperture 29 by vacuum suction pressure applied to the separation cavity 19 between the exterior housing 11 and the interior housing 12. Then, the outside air, as cooling air may be introduced into the interior housing 12 through the duct member 80 by the vacuum suction pressure and the drive motor 31 may be cooled in an air-cooled manner.

According to the cleaning apparatus 100, which has been described above contaminants adhered to the surface of the vehicle body in a contact manner may be separated and may be removed by air suction by using vacuum suction pressure, unlike the related art in which contaminants are removed by vacuum suction pressure of air in a contactless manner Therefore, in the exemplary embodiment of the present disclosure, the inflow amount of iron particles on the vehicle body to be loaded into the painting process from the vehicle body assembling process may be reduced. Accordingly, electrodeposition painting quality for the vehicle body may be improved.

In addition, suction pressure of air by the air intake member 50 having the dual housing structure and the ring shaped air intake cross section may be maximized and contaminants may be removed more efficiently by utilizing the most of the intake air as effective air to remove contaminants. Furthermore, since cooling air is introduced to the drive motor 31 and discharged to the outside by vacuum suction pressure of air, the drive motor 31 may be prevented from being overheated.

In the exemplary embodiment of the present disclosure as described above, the air intake passageway 54 to suction air has been described as being disposed in the air intake member 50 which is installed separately from the housing assembly 10. However, the present disclosure is not necessarily limited to the configuration having the air intake member 50 having the air intake passageway 54, and in the dual housing structure including the exterior housing 11 and the interior housing 12, the separation cavity 19 itself between the exterior housing 11 and the interior housing 12 may be formed as the air intake passageway.

While this disclosure has been described in connection with what is presently considered to be example embodiments, it is to be understood that the disclosure is not limited to the disclosed exemplary embodiments, but, on the contrary, is intended to cover various modifications and equivalent arrangements included within the spirit and scope of the appended claims.

DESCRIPTION OF SYMBOLS

1 . . . Cleaning target
3 . . . Robot
5 . . . Vacuum intake unit
7 . . . Hose
8 . . . Bolt
9 . . . Nut
10 . . . Housing assembly
11 . . . Exterior housing
12 . . . Interior housing
13 . . . Fixing bracket
15 . . . First portion
17 . . . Second portion
19 . . . Separation cavity
21 . . . Stopper
29 . . . Air discharge aperture
30 . . . Brush assembly
31 . . . Drive motor
33 . . . Mounting bracket
35 . . . Motor unit
37 . . . Speed reduction unit
39 . . . Driving shaft
41 . . . Brush body
43 . . . Brush bristle
50 . . . Air intake member
51 . . . Interior body
52 . . . Exterior body
53 . . . Stopping protrusion
54 . . . Air intake passageway
55 . . . Hook protrusion
57 . . . Guide flange
70 . . . Shock absorbing spring
80 . . . Duct member
81 . . . Electric wire

What is claimed is:

1. A cleaning apparatus, comprising:
   a housing assembly having an exterior housing coupled to a vacuum intake unit, and an interior housing fixed to the exterior housing at a preset interval from an interior surface of the exterior housing;
   a brush assembly disposed within the interior housing, and configured to rotate by a drive motor and contact a surface of a cleaning target;
   an air intake member having an air intake passageway connected with a cavity between the exterior housing and the interior housing and slidably coupled to the housing assembly; and
   a shock absorbing spring mounted on the housing assembly and configured to elastically support the air intake member.

2. The cleaning apparatus of claim 1, wherein the exterior housing and the interior housing are fixed by a bolt and a nut.

3. The cleaning apparatus of claim 1, wherein the brush assembly partially protrudes to the exterior of an air intake end of the air intake member.

4. The cleaning apparatus of claim 1, wherein the shock absorbing spring is mounted at an outer circumference of the exterior housing.

5. The cleaning apparatus of claim 1, wherein the exterior housing includes
   a first portion which has an upper end that is opened and connected with the vacuum intake unit; and
   a second portion integrally connected with a lower portion of the first portion, has an interior diameter greater than the first portion, and is opened at a lower end.

6. The cleaning apparatus of claim 5, wherein the interior housing has a closed upper end and an opened lower end, and is disposed within the second portion through a lower end of the second portion.

7. The cleaning apparatus of claim 1, wherein the drive motor is fixedly mounted within the interior housing by a mounting bracket.

8. The cleaning apparatus of claim 1, wherein the brush assembly includes:
   a brush body coupled to a driving shaft of the drive motor; and brush bristles fixed to the brush body and partially protrude to the to the exterior of the air intake end of the air intake member.

9. The cleaning apparatus of claim 1, wherein the air intake member includes:
    an interior body is slidably coupled to the interior housing at an outer periphery of the brush assembly; and
    an exterior body connected with the interior body, slidably coupled to the exterior housing, and having the air intake passageway formed between the exterior body and the interior body.

10. The cleaning apparatus of claim 9, wherein the air intake passageway is a ring shape between the interior body and the exterior body.

11. The cleaning apparatus of claim 9, wherein a plurality of stopping protrusions protrude upward from an upper end of the exterior body in an outer circumferential direction of the exterior housing, and the stopping protrusions are configured to be captured by a ring shaped stopper disposed on an outer circumferential surface of the exterior housing.

12. The cleaning apparatus of claim 11, wherein the stopping protrusions penetrate the stopper, and a hook protrusion formed at an upper end of the stopping protrusion is configured to be captured by the stopper.

13. The cleaning apparatus of claim 9, wherein a guide flange, is configured to guide intake air to the air intake passageway, and is formed at a lower end edge of the exterior body.

14. The cleaning apparatus of claim 13, wherein the shock absorbing spring is mounted at an outer circumference of the exterior body and configured to elastically support the guide flange.

15. The cleaning apparatus of claim 11, wherein a guide flange, is configured to guide intake air to the air intake passageway, and is formed at a lower end edge of the exterior body, wherein the shock absorbing spring is configured to support the stopper and the guide flange and is disposed at an outer circumference of the exterior body.

16. The cleaning apparatus of claim 1, wherein a duct member, through which an electric wire connected to the drive motor is extended external to the exterior housing and external air as cooling air is introduced into the interior housing, is disposed in the interior housing.

17. The cleaning apparatus of claim 16, wherein an air discharge aperture is formed in the interior housing, is connected with an interior of the exterior housing and discharges the cooling air.

* * * * *